United States Patent [19]

Schürger et al.

[11] 3,938,862

[45] Feb. 17, 1976

[54] FLUID BEARING SYSTEM

[75] Inventors: Rainer Schürger, Arnstein; Lothar Walter, Schweinfurt; Erich Burkl, Stammheim, all of Germany

[73] Assignee: SKF Industrial Trading & Development Company, B.V., Amsterdam, Netherlands

[22] Filed: Dec. 26, 1973

[21] Appl. No.: 427,554

[30] Foreign Application Priority Data

Dec. 27, 1972 Germany............................ 2263555

[52] U.S. Cl. .................................................. 308/9
[51] Int. Cl.² ........................................ F16C 39/04
[58] Field of Search ......................................... 308/9

[56] References Cited
UNITED STATES PATENTS

| 2,932,542 | 4/1960 | Smith | 308/9 |
|---|---|---|---|
| 3,472,565 | 10/1969 | Arneson | 308/9 |
| 3,493,273 | 2/1970 | Greenberg | 308/9 |
| 3,635,388 | 1/1972 | Jenkinson et al. | 308/9 |

*Primary Examiner*—James B. Marbert
*Assistant Examiner*—Robert Saifer

[57] ABSTRACT

A fluid bearing system for journalling a shaft against radial and/or axial loads. The described bearing consists of a housing having at least one fluid compression chamber. The housing surrounds the shaft and is provided with at least one portion which is stationarily fixed with respect to the shaft. Inlet means are provided through the stationary portion for the introduction of air or liquid. A ring securely fixed to the shaft for rotation therewith extends in opposition to the stationary portion. The ring forms with a surface of the stationary portion a throttling gap between the inlet and the compression chamber by which the restriction of fluid flow is accomplished.

12 Claims, 7 Drawing Figures an annular ring which extends outwardly in opposition to the housing and which forms with a stationary surface of the housing a throttling gap, which gap appears to be constantly rotating due to the relative movement of the annular ring and the housing. More specifically the bearing comprises a housing or shield surrounding the shaft which has at least one compression chamber formed on an interior surface. At least one portion of the housing is fixed so as to be stationary with respect to the shaft and is provided with conduit means for the inlet of the fluid under pressure. An annular ring is secured or otherwise fixed to the shaft to be conjointly rotatable with the shaft. The ring extends in opposition to the stationary portion of the housing and is spaced from a surface of the stationary portion to form a throttling gap between the inlet conduits and the compression chamber whereby restriction of the fluid flow into the chamber can be effected.

FLUID BEARING SYSTEM

BACKGROUND OF THE INVENTION

The present invention relates to a fluid bearing for journalling rotating shafts, in particular to a hydrostatic and/or aerostatic radial and/or axial load carrying bearings.

Fluid bearings are commonly employed to journal high speed rotary shafts such as yarn spinning or twisting spindles. In general, such bearings comprise an outer shell or housing in which one or more compression pockets are distributed uniformly about the axis of the shaft and into which a fluid under pressure is supplied. In these bearings, wherein the pressure medium is supplied by one pump, it is essential to provide throttling means or valve means to control the flow of fluid into the compartments in order to ensure the proper stability of the bearing. Different types of construction are known wherein these throtting means are integrated into the bearing itself.

Of the so called laminar (steady flow) throtting means the most common type comprises the use of a capillary tube valve. The drawback of this type of valve lies in the tolerance of the inner diameter of small capillary tubes. With the same length of tubes, the variances between inner diameters produces different hydraulic or aerostatic resistance. Since the resistance produced by capillary tubes is in a ratio to the inner radius of the tube approximating the "fourth power," it is disadvantageous that the fluctuation of the resistance is very great. Moreover, a pressure tight sealing connection of the capillary tube to the bearing compression compartment, is most difficult to obtain.

In addition to the use of capillary tubes, slot throtting means, integrated into the bearing, have also become known. These slot throttles are formed by the space between two surfaces of the fixed housing running normal to the axis of the shaft. While such constructions are effective the valve means formed therein have the drawback that the narrow flow apertures forming the throttling means readily become fouled so that frequent breakdown occurs during the operation of the bearing. It will of course be realized that this same drawback exists in the use of capillary tubes, since it is virtually impossible to provide a fluid media perfectly free of certain impurities.

It is the object of the present invention to provide a fluid bearing of the type described which overcomes the difficulties and drawbacks of the prior art.

It is a further object of the present invention to provide a fluid bearing employing either fluid or air media in which the throttling gaps or means are reliably prevented from fouling.

It is a further object of the present invention to provide a fluid bearing system in which an improved construction forming the throttling or valving means is provided, integrated totally within the bearing itself.

It is a further object of the present invention to provide a fluid bearing system having superior load capacity and rigidity for axial and/or radial load conditions.

The foregoing objects, other objects, and numerous advantages will be apparent from the following disclosure.

SUMMARY OF THE INVENTION

Briefly, the objects and advantages of the present invention are obtained by securing to the rotating shaft an annular ring which extends outwardly in opposition to the housing and which forms with a stationary surface of the housing a throttling gap, which gap appears to be constantly rotating due to the relative movement of the annular ring and the housing. More specifically the bearing comprises a housing or shield surrounding the shaft which has at least one compression chamber formed on an interior surface. At least one portion of the housing is fixed so as to be stationary with respect to the shaft and is provided with conduit means for the inlet of the fluid under pressure. An annular ring is secured or otherwise fixed to the shaft to be conjointly rotatable with the shaft. The ring extends in opposition to the stationary portion of the housing and is spaced from a surface of the stationary portion to form a throttling gap between the inlet conduits and the compression chamber whereby restriction of the fluid flow into the chamber can be effected.

Because of the relative movement between the two surfaces that form the throttling gap, the probability of fouling by impurities found in the fluid media is effectively precluded. The throttling gap is consequently self-cleansing. By virtue of the construction according to the present invention a distinct advantage can be obtained in that the space forming the throttling gap can be of a very low height or narrow dimension while at the same time have a large width and a short length of flow. The present invention has an additional advantage in that the manufacture of the bearings utilizing the present construction is simple because they are formed mainly of cylindrical parts which may be machined with particularly fine surfaces without difficulty.

According to the present invention, bearings adapted to receive axial loads, are characterized by the fact that the throttling gap can be easily formed to lie between the peripheral surface of the rotating ring and the inner bore of an annular portion of the housing, which portion can be fixed against rotation and be provided with radially directed supply inlets for the pressurized medium. The compression chamber or compression chambers are arranged to be normal to the shaft to absorb axial loads. However, because the direction of flow of the throttle gap runs axially, any relative axial movement between the shaft and the housing, due to an external load, would not cause any variation in the throttling gap, the movement being parallel to the direction of the throttling gap. Thus, any influence or effect upon the throttle resistance to the flow of fluid media is precluded.

Correspondingly, it is possible to obtain a constant throttle gap integrated in a radial load absorbing bearing. According to the present invention a bearing adapted to receive radial loads is formed so that the throttling gap lies normal to the axis of the shaft between the frontal end surfaces of the rotating ring and the opposing surfaces of the stationary portion of the housing. The bearing compartments are recessed and run parallel to the axis of the shaft. In this manner the direction of flow of fluid in the throttle gap will be radial so that any radial shifting of the shaft relative to the housing will not result in any variation of the size of the throttling gap and will therefore not influence the resistance of the throttling gap to the flow of fluid.

In a further development of a bearing adapted to receive radial loads, it may be preferable to arrange the rotating ring on the shaft so as to be axially movable along its surface while being held for conjoint rotation. This measure is of particular advantage in the situation where loose or free bearings are intended. It may also be preferable in radial bearings to form pre-throttling gaps running axially between the peripheral surface of the rotating ring and the inner surface of the annular bore of the stationary housing portion opposite to it. It is the purpose of these pre-throttling gaps to ensure that in the event of any axial shifting of the ring between the pre-throttle gap and the main radial throttling gap, different pressures can be formed on either side of the rotating ring. This difference in pressure forces the axially movable ring back into its original position so that both the main radial throttling gaps are kept of equal size.

It may also be preferable, in order to prevent different pressures from being built up in axially adjacent compartments of the loose bearing constructions, to provide conduit drillings running generally in an axial direction through the housing to connect the axially adjacent pair of compartments.

Full details of the present invention together with the details of the several preferred embodiments are given in the following description and are shown in the accompanying drawings.

DESCRIPTION OF THE INVENTION

Figure 1:
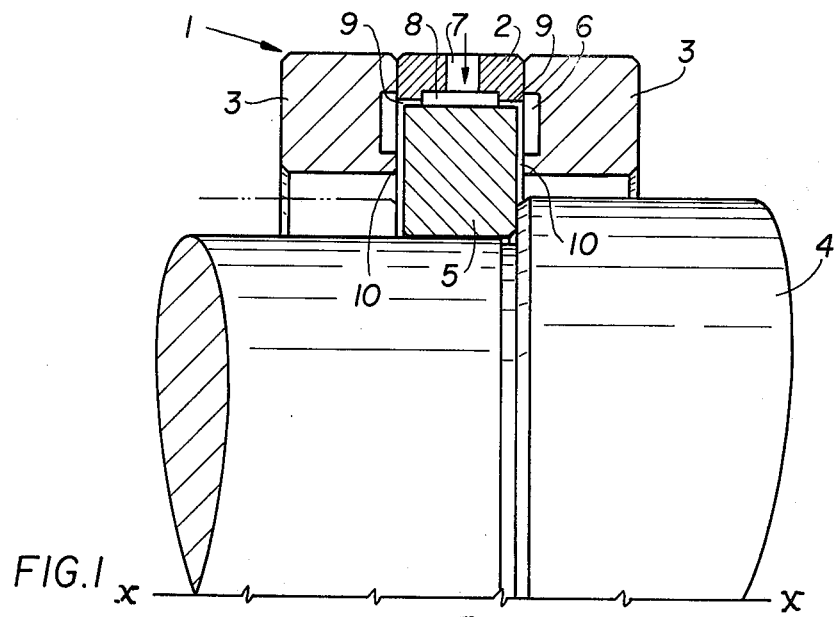
FIG. 1 is a longitudindal section of the upper portion of an axial bearing formed in accordance with the present invention mounted upon a shaft.

In general, the following description omits such details, except for the present invention, as are conventional and well known to those skilled in the art. Amongst the omitted details are the forms for bearing supports, the form of the compression chambers, and details of the fluid media, its pressure pump or the like. In the accompanying drawings all of the Figures bear similar reference numerals depicting similar parts of the structure and function.

The bearing depicted in FIG. 1 serves for the axial support of a rotatable shaft mounted to rotate about its axis X—X and on which axial loads can be placed from both directions.

The bearing comprises a unitary housing 1 consisting of a central spacer 2 interposed between a pair of similarly formed end discs 3. The end discs and the central spacer are preferably unitarily or integrally secured together to form a generally cylindrical sleeve like housing arranged about a rotatable shaft 4. The spacer 2 has a larger inner diameter than that of the end discs 3 and within the space so formed there is arranged an annular ring 5 which is fixedly secured as by wedging, welding or the like to the shaft 4. The ring 5 is thus conjointly rotatable with the shaft 4 and extends radially outwardly between the end discs 3 toward the inner surface of the spacer 2. The shaft 4 is provided with a shoulder against which the ring 5 abuts. Such a shaft is conventional in supporting spindles and the like against axial loads.

Each of the end discs 3 is provided with a continuous annular groove forming a compression chamber 6. The groove is cut into the interior frontal face lying generally opposite to the ring 5. If desired, the single compression chamber may be replaced by a plurality of chambers or pockets extending in a circle about the interior frontal faces of the discs 3 uniformly about the central axis. The spacer 2 is provided with a radially directed feed duct 7 through which is introduced a pressurized media such as oil, air or the like from a pump or accumulator located exteriorly of the bearing and not shown in the drawings. The inlet duct 7 leads into an annular groove 8 cut into the interior face of the spacer 2. The diameter of the ring 5 and the inner diameter of the spacer 2 are designed so that the ring 5 is spaced from the surface of the spacer 2 to provide an annular gap 9 to either side of the annular groove 8. The gap 9 forms an inlet throttle or restrictor gap between the groove 8 and the compression compartments 6, allowing the pressurized fluid media to flow from the inlet 7 to the compression compartment 6. Similarly, the axial width of the ring 5 is designed so that its frontal faces are spaced from the frontal faces of the discs 3 providing an outlet or discharge gap 10 between them. It will be observed that the inlet throttle or restrictor gaps 9 extend axially or parallel to the axis of the shaft while the outlet or discharge gaps 10 extend radially or normal to the shaft. The pressurized medium flows via the inlet duct 7, the annular groove 8 into the bearing compartment 6 (or plural compartments 6) from which it flows outwardly to the discharge gaps 10 without, or at zero pressure. Stabilization of the bearing under axial load conditions is provided by the restriction of one or the other of the discharge gaps 10 allowing for the build-up of pressure in the corresponding compression chamber 6 and the simultaneous decrease in pressure in the opposing chamber 6. These pressure differences cause the forces within the bearing to counteract the external axial force thus causing the shaft to counteract against this force until a state of balance or equilibrium is achieved within it.

Since the two inlet throttle gaps 9 run axially, an axial shaft of the shaft 4, on account of any external load does not create any variation in the size of the gap and therefore does not create any change in the throttling resistance to the flow of fluid. Therefore the integrated throttling gaps 9 remain constant and provide a uniform pressurized flow constantly to the compression chambers 6. Preferably the entire housing 1 is fixed within an outer bushing (not shown) so that it is stationary with respect to the shaft 4. As a result the relative movement between the ring 5 and the spacer 2 creates an apparently constantly movable throttling or restricting gap 9 in which fouling by impurities carried in the fluid media, is effectively precluded. The constant rotation of the ring 5 during regular operation effects a constant cleaning of the gaps 9. A further advantage of the bearing according to the invention resides in the fact that in comparison to the traditional or the commonly used axial bearings, only half the flow of the pressure medium is needed.

It is further emphasized that the throttling ratio (the ratio between the inlet throttling resistance and the discharge resistance) does not alter at high speeds because the frictional heat created in both the inlet gap 9 and the discharge gap 10 is the same. Thus, the viscosity of the pressurized medium is varied uniformly at both points. It is finally mentioned that the pressure medium can not be hurled by centrifugal force outwardly of the discharge gaps because due to the flow obtained in the bearing compartments 6 the centrifugal force is oppositely directed.

Figure 2:
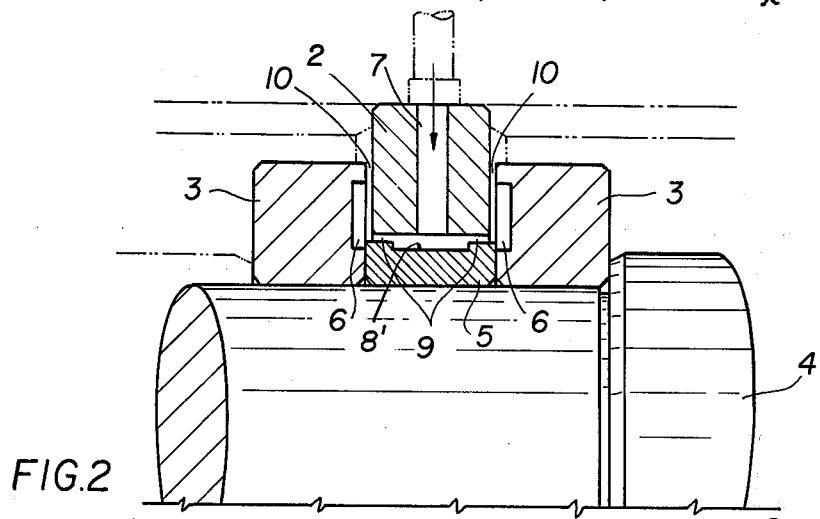
FIG. 2 is a view similar to FIG. 1 showing a second form of axial bearing.

In FIG. 2 a variant of the bearing of FIG. 1 is shown. In this variant the spacer 2 and discs 3 forming the housing are separable from each other. The discs 3 are fixed to the shaft 4 while the spacer 2 is fixed to the bushing or other support. The rotating ring 5 is arranged between the two discs 3 and rotates conjointly with the shaft 4 and the discs 3. The discs 3 are provided with compression chambers 6 of the singular annular type or of the plural pocket type on their inward frontal faces. An inlet duct 7 radially extends through the stationary spacer 2 which has a smaller inner diameter than that of FIG. 1. The distribution groove for the fluid media is formed in the peripheral face of the ring 5 and is depicted by the numeral 8'. As in FIG. 1, the peripheral surface of the ring 5 is spaced from the spacer 2 so as to provide axially extending inlet throttling gaps 9 leading from the annular groove 8' into each of the compression chambers 6. The discharge gaps 10 as in FIG. 1, run in a radial direction. However, here they exist between the frontal faces of the discs 3 and the spacer 2 and lead into the space between the housing and the supporting bushing illustrated in the dot-dash lines. The bearing of FIG. 2, as well as of FIG. 1, may be retained in place by locating a retaining sleeve indicated by the dot-dash lines in the left hand side of the shaft 4 abutting against either the ring 5 in FIG. 1 or the disc 3 in FIG. 2. Axial loads placed on the shaft 4 from either direction is thus transmitted to the bearing.

Figure 3:
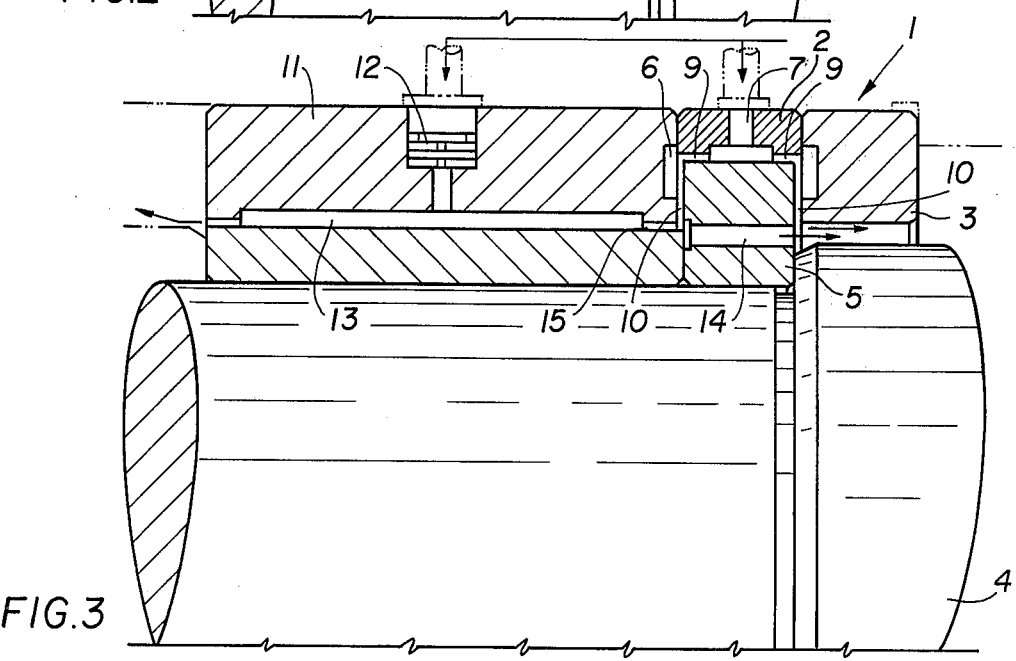
FIG. 3 is a similar view of a axial bearing in conjunction with a radial bearing.

FIG. 3 depicts the combination of a axial fluid bearing of the type shown in FIG. 1 with a conventional radial fluid bearing. The left hand end disc 3, of the housing 1 of the axial bearing represented in FIGS. 1 or 2 is replaced by the outer ring 11 of the conventional radial bearing. The inner frontal end surface of the bearing 11 adjusts against the stationary spacer 2 and is provided with the compression chambers 6 corresponding to those formed on the right end disc. The pressure media supplied from the pump passes through the inlet duct 7 via the inlet throttling gaps 9 into the chambers 6. The radial portion of the bearing is similarly provided with an inlet duct in which is located a disc type throttling valve 12 leading to the compression compartments 13 of the radial bearing. The compression compartments 13 may be a continuous annular groove formed on the inner face of the outer member 11 or it may be in the form of a plurality of uniformly spaced pockets encircling the shaft 4. The compression pockets 13 extend axially or parallel to the shaft 4 and are provided with axial outlet or discharge gaps 15. The rotating ring 5, secured to the shaft 4 is provided with a bore 14 running in an axial direction communicating with the radial discharge gap 10 from the axial compression chambers 6 and the axial discharge gap 15 running from the radial compression compartments 13 allowing the discharge fluid to flow under zero pressure outwardly of the bearing. In this embodiment the entire housing 1 may be considered as the right end disc 3, the spacer 2 and the outer portion 11 of the radial bearing section. The housing 1 is preferably secured in a bushing or similar supporting member so as to be non-rotatable with respect to the shaft 4.

Figure 4:
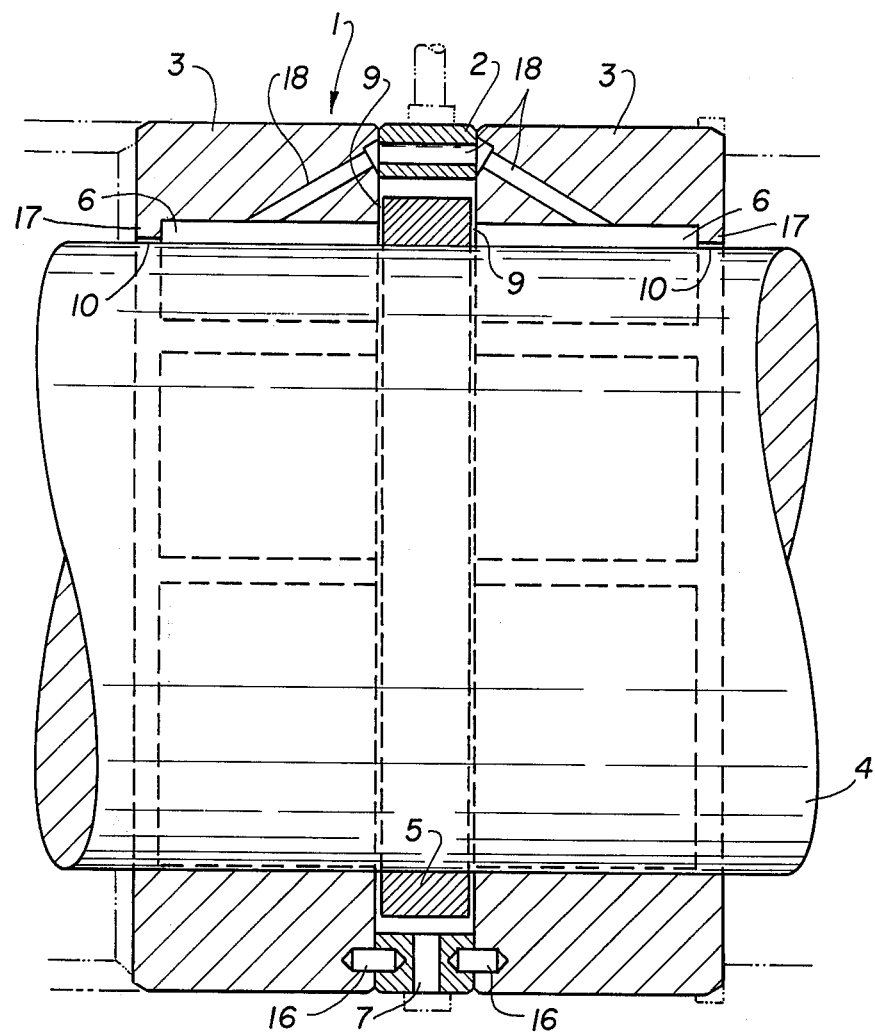
FIG. 4 is a view of a radial bearing formed in accordance with the present invention.

The bearing depicted in FIG. 4 serves to absorb and receive radial loads only. The bearing comprises a housing 1 formed of end discs 3 and a central spacer 2 preferably secured and stationarily held in an exterior bushing. The compression pockets 6 are uniformly distributed over the inner radial surface of the end discs 3. This Figure depicts the uniform distribution of a plurality of pockets or compression chambers 6 separated by bridging or wedge portions on the interior or bore surface of the discs 3. This Figure further illustrates a means for joining the end discs 3 and the spacer 2. A plurality of bolts 16 interconnecting these members is shown. The bolts 16 are distributed about the bearing so as to prevent twisting or separation of the discs 3 and the spacer 2. The spacer 2 is provided with one or more inlet ducts 7. Arranged on the shaft 4 so as to be axially movable with respect to it is a ring 5, whose peripheral edge is spaced from the spacer 2 so as to provide an annular space for the distribution of the fluid media from the inlet ducts 7. The frontal end surfaces of the ring 5 are spaced from the opposite edges of the end discs 3 so as to form radially directed inlet throttling gaps 9 through which the pressurized medium may flow into the compression compartments 6. The compression chambers or compartments 6 are bounded on their axial exterior ends by radially inwardly directed shoulders 17 which are spaced from the surface of the shaft 14 to provide suitable discharge gaps 10 through which the fluid media may flow outwardly from the bearing chambers 6.

The fluid radial bearing according to FIG. 4 is in the form of a loose or axially free bearing. Since in a loose bearing the shaft 4 has to be axially movable, it is important to prevent the inlet throttling gaps 9, at each of the frontal ends of the ring 5, to be subjected to fluctuation. Otherwise in the axially adjacent compression compartments 6 different pressures would be built up. In order to prevent such fluctuation, pressure compensating ducts 18 are drilled in the housing 1 so that a connection for the by-pass flow of fluid media can be made between each of the axially spaced rows of compression chambers 6. In the event of any dynamic build-up in pressure in the inlet throttling gaps 9 the axially movable ring 5 is shifted or slided axially along the shaft 4.

Figure 5:
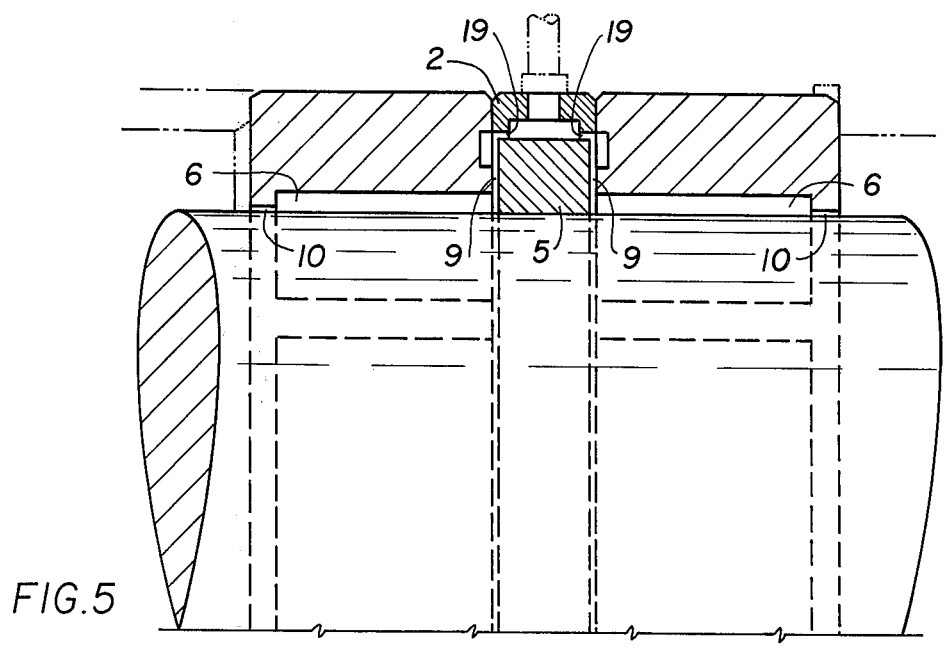
FIG. 5 is a view similar to FIG. 4 showing another form of radial bearing.

The bearing represented in FIG. 5 also serves to absorb radial loads. In the form shown in this Figure, the pressure medium passes through the radially directed annular inlet throttling gaps 9 formed as in FIG. 4 between the axially movable ring 5 and the surfaces of the end discs 3 opposite the latter, into the compression compartments 6 from which it flows outwardly through the discharge gaps 10. In distinction to the construction shown in FIG. 4, the construction shown in FIG. 5 provides a spacer 2 similar to that shown in FIG. 1 which is provided with an annular distribution groove. The peripheral surface of the ring 5 is spaced from the inner bore of the spacer 2 so as to provide a second set of pre- or auxiliary- inlet throttling gaps 19. These gaps 19 lead to a set of compression compartments similar to those shown in FIG. 1 formed on the inner frontal surfaces of the end discs 3. The inlet throttling gaps 19 are directed axially parallel to the shaft. It is the purpose of the pre-throttling gaps 19 to provide, that under the axial movement of the ring 5 in the space between the discs 3, that different pressure can be built up between the main throttling gap 9 and the pre-throttling gap 19. This pressure difference will then cause the shifting of the ring 5 back into its original central or equilibrium position so that the main inlet throttling gaps 9 are kept and maintained at the same size ensuring a constant resistance of the two main throttling gaps 9. In the event a purely radial load is created on the shaft, no pressure differential occurs between the axially adjacent bearing compartments 6, however, the absorption of momentary loads may create pressure differentials between such axially adjacent compartments 6. This is done so that, for instance when the shaft is tilted downward to the left, the left hand upper throttle gap 9 and the right hand lower throttle gap diametrically opposite to the latter are reduced in size, increasing restriction on the flow of fluid, while on the other hand the right hand upper throttling gap 9 and the left hand lower throttling gap diametrically opposite thereto are increased. At the same time the corresponding discharge gaps 10 are reduced or enlarged corresponding thereto so that the equilibrium or state of balance condition is achieved.

Figure 6:
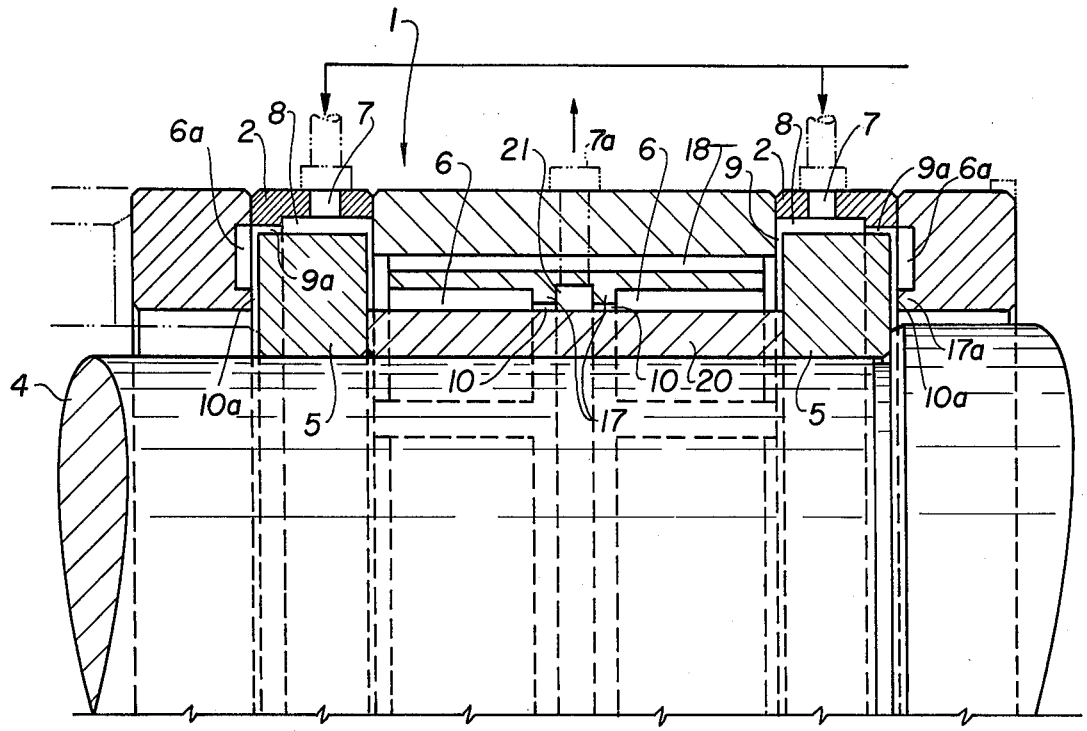
FIG. 6 is a view of a radial and axial bearing formed in accordance with the present invention.

A fluid bearing adapted to absorb both radiall and axial loads is shown in FIG. 6. The bearing comprises in the main a combination of a double row radial bearing formed in accordance with FIG. 4 centered between two halves of the double row axial bearing shown in FIG. 1. Two rings 5 are fixed about the shaft 4, separated by a spacing sleeve 20. The bearing compression compartments 6 for the radial bearing are formed on the inner surface of a common cylindrical member and are separated by radially inwardly directed shoulders 17 which are spaced from the central spacer 20 so as to provide discharge gaps 10 leading to a common annular discharge distribution groove 21 formed between the shoulders 17. Leading from the discharge distribution groove 21 radially outward is one or more ducts 7a for the discharge of the media. The discharge gaps 10 for the radial bearing extend axially in parallel with the shaft 4. The discharge gaps 10a for the axial bearing extend radially or normal to the shaft 4 on opposite side of the respective rings 5 communicating with the axial bearing compartments 6a. The spacers 2 each have inlet ducts 7 through which the pressure medium is initially supplied into the annular chambers or spacers 8. From there it flows on the one hand via the axially directed annular inlet throttling gaps 9a to the bearing compartments 6a of the two axial bearings and on the other hand via the radially directed inlet throttling gaps 9 which are formed between the inward facing end surfaces of the rings 5 and the housing surfaces opposite the latter into the compression compartments 6 of the double row radial bearing section. As has already been mentioned, the pressure medium flows outwardly of the bearing compartments 6a of the axial bearings via the radially directed discharge gaps 10a and out of the compression compartments 6 of the radial bearing section outwardly through the ducts 7 via the axially directed bearing gaps 10.

A pressure equalizing bore 18 runs axially in the housing 1 between the axially spaced compression compartments 6 of the radial bearing so as to prevent the occurrence of pressure differential between these compartments. Such pressure differentials could occur as a result of the axial shifting of the shaft 4 on account of external forces thereon, because here the radially directed throttling gaps 9 of the radial bearing section may be caused to vary under such loads. The pressure compensating conduit 18 is only needed, however, if fluctuations in the bearing stability have to be prevented at all cost. If this condition is not essential, the pressure equalizing conduits 18 can be dispensed with so that the radial bearing can absorb momentary load changes.

Figure 7:
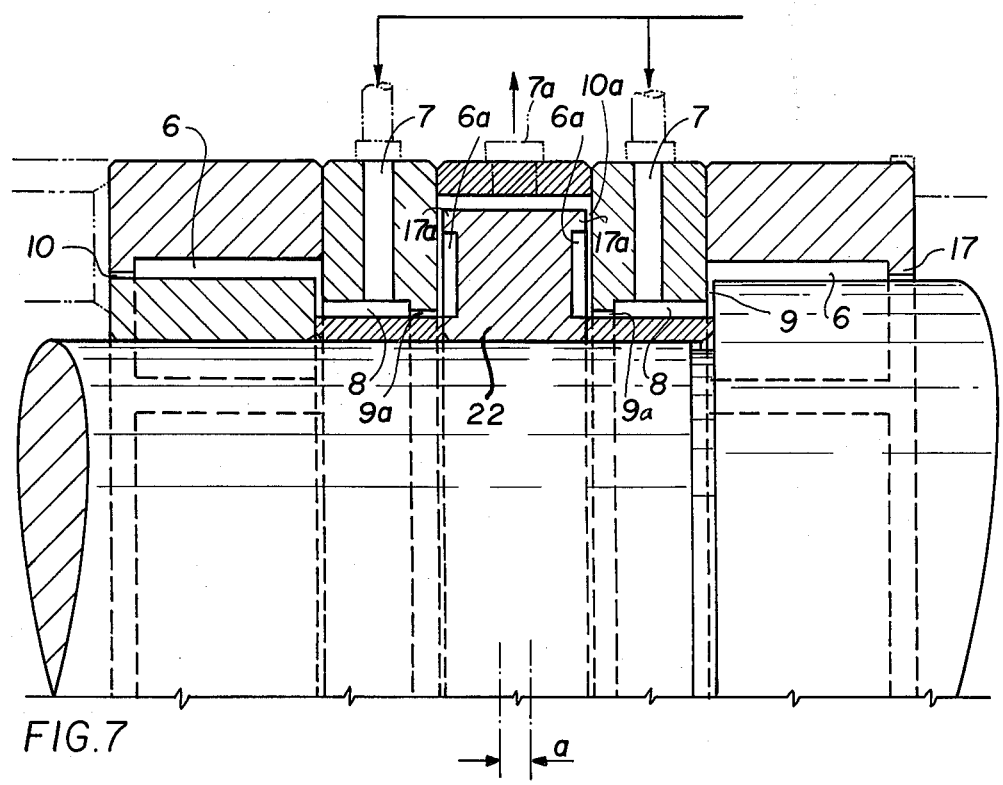
FIG. 7 is still another view of a radial axial bearing formed in accordance with the present invention.

In FIG. 7, a complete spindle bearing is shown with which axial and radial loads may be absorbed. It differs from the example of FIG. 6 mainly in that the bearing compression compartments 6a for the axial bearing sections are arranged in the middle of the bearing as a whole while the bearing compression compartments 6 for the two radial bearings are provided to either side or axial ends of the axial bearing section. The inlet throttling gaps 9a which run axially for the axial bearing section and the gaps 9 which run radially for the radial bearing section are provided on either side of the annular chambers 8 formed by the spacers 2 in which inlet ducts 7 are provided. The pressurized medium is supplied through the throttling gaps 9, wherein it is reduced to compression compartment pressure, and passed to the compression compartment 6 of the radial bearing section and through gaps 9a to the axial bearing sections 9a whence it flows outwardly through the discharge gaps 10a under zero pressure.

Both the axial and radial bearings shown in this variant, require only half the quantity of flow of pressurized medium compared with conventional hydrostatic or aerostatic bearings. On the other hand with the same quantity of pressurized medium flowing through the bearings, the surfaces of the shoulders 17, 17a forming the discharge gaps 10 and 10a respectively can be reduced thereby reducing significantly the amount of friction created. According to the structural conditions required for the placement of the bearing and the momentary loads to be absorbed, the distance between the left and right hand halves of the bearings can be varied by the installation of central spacer members 22 of differing lengths, denoted by the spatial arrows a.

As seen from the foregoing, each of the embodiments of the present invention provide inlet throttling gaps in which at least one of the surfaces forming the gap is under rotation so that the throttling gap may be considered as rotating itself. In this manner the advantage of providing a non-fouling inlet to the compression chambers is obtained. Further the objects, advantages and relative improvements enumerated in the introduction to the present description will be obvious from the preceding description of the preferred embodiments. While the description emphasized axial and/or radial bearings having compression compartments arranged in two rows relative to each other, it will be quite obvious to those skilled in the art that the concept of the present invention may be applied to single row fluid bearings. Various other embodiments and changes will be obvious to those skilled in the art. Accordingly, it is intended that the present disclosure be taken as illustrative only of the invention and not as limiting of the scope thereof.

Should additional details of the specific construction of bearings of the general type herein described be necessary reference may of course be made to the copending application, Ser. No. 409,704, filed on Oct. 25, 1973 by two of the inventors herein, and assigned to the same assignee, the disclosure of which is incorporated herein as if it were fully set forth.

What is claimed is:

1. A fluid bearing for a rotary shaft comprising a housing surrounding said shaft and forming at least one annular compression chamber on the interior surface thereof, at least one portion of said housing being annular and fixed stationary with respect to said shaft and having conduit means for the inlet of fluid under pressure to said chamber, a ring secured to said shaft for rotation therewith and extending within said compression chamber in spaced opposition to said stationary portion, having a peripheral surface coacting with said annular portion to divide said compression chamber into laterally spaced sections, said ring forming with the surface of said stationary portion a circumferential compression space and lateral throttling gaps between the inlet conduit and said lateral sections of the compression chamber for restriction of fluid flow under both radial and axial loads.

2. The bearing according to claim 1 wherein said throttling gap extends axially with respect to said shaft.

3. The bearing according to claim 1, wherein said stationary portion has an annular surface lying normal to the axis of said shaft, said throttling gap being formed between said surface and a parallel and opposite lying end of said ring.

4. The bearing according to claim 1 wherein said throttling gap extends radially with respect to said shaft.

5. The bearing according to claim 1 wherein the ring is axially movable on said shaft.

6. The bearing according to claim 1 including at least two rows of compression chambers axially spaced from each other and ducts extending between said rows for equalizing the pressure therein.

7. The bearing according to claim 1, wherein said housing comprises a pair of end discs and said annular portion comprises at least one spacer located therebetween fixed against rotation relative to said shaft and forming the stationary portion of said bearing.

8. The bearing according to claim 7 wherein said housing is formed with two rows of compression chambers lying on the frontal faces of said end discs on opposite sides of said stationary portion in a direction normal to said shaft.

9. The bearing according to claim 7 wherein said housing is formed with two rows of compression chambers lying on the interior faces of said discs in a direction parallel to the axis of said shaft.

10. A fluid bearing according to claim 1, wherein said housing is formed by a central annulus having a large internal diameter, and a pair of lateral annular members integrally secured with said annulus having an internal diameter smaller than that of said annulus and positioned each on one side of said annulus; the open interior of said housing being defined by the inner surface of said annulus extending in axial direction parallel to the axis of the shaft and by the side walls of said lateral annular members extending adjacent said bottom radially and substantially perpendicularly to the axis of said shaft; said conduit means being open to the interior of said housing and being coupled to a source of a fluid under pressure.

11. The bearing according to claim 1, wherein said annular compression chamber is defined by an annular depression provided in and along the bottom of said annular stationary portion and by the peripheral surface of said ring.

12. The bearing according to claim 1, wherein said annular compression chamber is defined by an annular depression provided in and along the peripheral surface of said ring and by the bottom of said annular stationary portion.

* * * * *